(12) United States Patent
Kline

(10) Patent No.: US 7,574,975 B2
(45) Date of Patent: Aug. 18, 2009

(54) PET SEAT ARRANGEMENT

(76) Inventor: Nancy Kline, 917 Emerald St., Redondo Beach, CA (US) 90277

( * ) Notice: Subject to any disclaimer, the term of this patent is extended or adjusted under 35 U.S.C. 154(b) by 382 days.

(21) Appl. No.: 11/154,302

(22) Filed: Jun. 16, 2005

(65) Prior Publication Data

US 2008/0257269 A1 Oct. 23, 2008

(51) Int. Cl.
*A01K 1/035* (2006.01)
*B60R 22/00* (2006.01)
(52) U.S. Cl. ........................ 119/28.5; 297/473; 297/485
(58) Field of Classification Search ................ 119/28.5, 119/482, 771, 496, 497, 498; 297/464, 468, 297/473, 485; 5/81.1, 627, 628, 93.2, 94, 5/98.3; D30/118
See application file for complete search history.

(56) References Cited

U.S. PATENT DOCUMENTS

| | | | | |
|---|---|---|---|---|
| 1,263,097 A * | 4/1918 | Moormeister | .................... | 5/94 |
| 2,546,790 A * | 3/1951 | Shook | ........................ | 297/255 |
| 2,557,556 A * | 6/1951 | Morris | ....................... | 224/201 |
| 2,601,488 A * | 6/1952 | Allen | .............................. | 5/94 |
| 2,636,548 A * | 4/1953 | Berlin | ........................... | 297/8 |
| 2,641,773 A * | 6/1953 | Kramer | ........................... | 5/94 |
| 2,735,113 A * | 2/1956 | Turner | ............................ | 5/94 |
| 2,772,423 A * | 12/1956 | Linden | ........................... | 5/94 |
| 2,979,121 A | 4/1961 | Gates | ........................... | 297/487 |
| 3,115,364 A * | 12/1963 | Berlin | ........................... | 297/130 |
| 3,203,011 A * | 8/1965 | Faludi | ............................. | 5/94 |
| 3,426,368 A * | 2/1969 | McCluskey | ..................... | 5/94 |
| 3,436,770 A * | 4/1969 | Turner | ............................ | 5/94 |
| 3,454,968 A * | 7/1969 | Beckman | ......................... | 5/94 |
| 3,574,872 A * | 4/1971 | Mattila | ............................ | 5/94 |
| 3,735,430 A * | 5/1973 | Platz | ............................. | 5/118 |
| 3,833,946 A * | 9/1974 | Von Wimmersperg | ........... | 5/94 |
| 4,366,587 A * | 1/1983 | Takada | ............................ | 5/94 |
| D268,630 S | 4/1983 | Wilson | ........................ | D6/333 |
| 4,512,286 A | 4/1985 | Rux | ............................ | 119/771 |
| D283,855 S | 5/1986 | Kujawski | ..................... | D6/333 |
| 4,597,359 A | 7/1986 | Moorman | .................... | 119/285 |
| 4,889,388 A | 12/1989 | Hime | ........................ | 297/464 |
| 4,924,814 A * | 5/1990 | Beaudet | ...................... | 119/712 |
| 4,934,004 A * | 6/1990 | Friedman | ......................... | 5/94 |
| 4,943,105 A * | 7/1990 | Kacar et al. | .............. | 296/24.31 |
| 5,005,526 A * | 4/1991 | Parker | ......................... | 119/751 |
| 5,044,321 A | 9/1991 | Sewlph | ........................ | 119/771 |
| 5,133,294 A * | 7/1992 | Reid | ........................... | 119/771 |
| 5,275,464 A | 1/1994 | Eichhorn et al. | ............ | 297/488 |
| 5,277,148 A | 1/1994 | Rossignol | ...................... | 119/19 |
| D348,783 S | 7/1994 | Young | ......................... | D6/333 |
| 5,341,530 A * | 8/1994 | Ward | ............................ | 5/93.1 |
| 5,419,602 A * | 5/1995 | VanHoose | .................. | 296/39.1 |
| 5,474,329 A | 12/1995 | Wade et al. | ................. | 280/749 |
| 5,479,892 A * | 1/1996 | Edwards | ..................... | 119/771 |
| 5,487,361 A * | 1/1996 | Dean | .......................... | 119/28.5 |
| 5,529,341 A * | 6/1996 | Hartigan | .................... | 280/749 |
| 5,551,371 A | 9/1996 | O'Donnell | .................. | 119/285 |

(Continued)

OTHER PUBLICATIONS

U.S. Appl. No. 11/786,632 filed Apr. 12, 2007, O'Donnell.

*Primary Examiner*—Yvonne R. Abbott
(74) *Attorney, Agent, or Firm*—Kilpatrick Stockton LLP

(57) ABSTRACT

A pet seat for carrying a pet in a vehicle in which the pet is secured in the pet seat and the pet seat is secured in the vehicle against the vehicle seat and the vehicle seat back.

20 Claims, 4 Drawing Sheets

U.S. PATENT DOCUMENTS

| | | | |
|---|---|---|---|
| 5,551,373 A * | 9/1996 | O'Donnell | 119/28.5 |
| 5,718,191 A | 2/1998 | O'Donnell | |
| 5,785,003 A | 7/1998 | Jacobson et al. | |
| 5,832,874 A | 11/1998 | Ravin | |
| 6,058,529 A * | 5/2000 | Goysich | 5/94 |
| 6,079,370 A * | 6/2000 | Al-Birmani et al. | 119/771 |
| 6,327,726 B1 * | 12/2001 | Weber | 5/655 |
| 6,526,608 B1 * | 3/2003 | Hsia | 5/99.1 |
| 6,954,955 B2 * | 10/2005 | Brewin et al. | 5/655 |
| 7,204,205 B2 * | 4/2007 | O'Donnell | 119/771 |
| 7,225,756 B2 * | 6/2007 | Greenfield | 119/28.5 |
| 7,448,345 B1 | 11/2008 | O'Donnell | |
| 2005/0028287 A1 * | 2/2005 | Fee | 5/655 |
| 2005/0284415 A1 * | 12/2005 | O'Donnell | 119/771 |

* cited by examiner

PET SEAT ARRANGEMENT

BACKGROUND OF THE INVENTION

1. Field of the Invention

This invention relates to seats for pets and more specifically to an improved pet seat or bed for holding a pet in a secure position in a vehicle and which may also be utilized as a pet bed in locations other than a vehicle and also may be utilized for carrying a pet.

2. Description of the Prior Art

Many seats for pets which may be utilized in vehicles for transporting the pets have heretofore been described and/or offered for sale. Many such devices were the same as or similar to booster seats for children. Some of the prior art pet seats were specifically designed for pets rather than children and which recognized the needs of the pet rather than the child. In many of the prior art pet seats for vehicles the seat itself was not attached to the seat or back of the vehicle seat in a secure fashion or else required modification to the vehicle seat/back for securing the pet seat. Such modifications were often expensive and difficult to install in a vehicle. Still other vehicle pet seats did not provide for or allow the pet, when positioned in the seat, to have the visibility of the surroundings that many pets, such as dogs, desire when in a vehicle. Still other prior art pet seats have nave had mechanical structures incorporated therein which increases the cost and complexity of such pet seats. Further, some prior art pet seats did not provide for adequately and safely securing the pet into the seat as well as securing the seat in the vehicle.

Since the advent of various seat belt configurations installed in motor vehicles it is desirable from a safety and economy consideration to utilize such seat belts for securing the pet seat in the vehicle. The design of the conventional seat belt often utilized in vehicles generally consists of shoulder harness incorporated into a single seat belt arrangement which provides the functions of both a lap belt and the shoulder harness. Such seat belts, while useful for restraining humans, are not adaptable for directly securing or restraining pets.

It is desirable to have the pet seat incorporate structure for securing the pet in the pet seat by utilizing an attachment to the conventional collar/harness of the pet. In some of the prior art pet seats the vehicle seat belt structure was utilized to restrain the pet seat but at least some portions of the vehicle seat belt structure were in regions accessible to the pet. In such prior art pet seats, the pet could chew on the securing vehicle seat belt structure thereby weakening the seat belt and thus impairing its safety function.

In the case of any motion of the vehicle inducing rapid changes in acceleration such as sudden stops, accidents and the like, it is desired that the pet seat provide a cushioning effect in the sides, front, back as well as a cushioned seat upon which the pet may sit and or lie down.

Since many pets desire to look in the direction of travel, it is desirable to have the pet seat designed so that the forward vision of the pet while in the pet seat is minimally obscured and yet the forward portion of the pet seat still providing cushioning for the pet.

The structure of the pet seat should be complementary to and inter-engaging with the design of seats in vehicles. At the present time, many vehicle seats and seat backs are designed to have upright cushioning ridges at the edges of both the seat and the back. Thus, it is desirable that the pet seat have structure to accommodate these ridges, and yet still be compatible with older style substantially flat bench seats and backs often used in vehicles.

In some of the prior art pet seats, complicated and costly rigid mechanical arrangements or other rigid structures have been incorporated into the seat design. Such rigid structures could injure the pet and/or add cost to the manufacture of the pet seat. It is desirable that the pet seat be free of the rigid mechanical structures or components so that the cost of the pet seat and safety of the pet are provided.

The prior art pet seats have not been able to provide these desiderata.

SUMMARY OF THE INVENTION

Accordingly, it is an object of the present invention to provide an improved pet seat particularly useful for transporting a pet in a vehicle.

It is another object of the present invention to provide a pet seat that has cushioning in the front, back, sides and seat, but still allows an improved forward vision for the pet in the pet seat.

It is another object of the present invention to provide an improved pet seat that may be restrained in a vehicle utilizing the conventional seat belt found in vehicles.

It is another object of the present invention to provide a pet seat for vehicles in which the vehicle seat belt is utilized to restrain the pet seat but generally is not accessible to a pet in the pet seat.

It is yet another object of the present invention to provide an improved pet seat for vehicles in which there is incorporated structure for attachment to the pet's collar or harness to restrain the pet in the pet seat.

The above, and other objects of the present invention may be achieved, according to a preferred embodiment thereof by providing a body having a seat member, a pair of spaced apart opposed side members, a back member and a front member. The pair of spaced apart opposed side members, the back member and the front member are upstanding from the seat member and the seat member, side members, back member and front member define a pet accepting cavity therebetween. The body is fabricated from a flexible, resiliently deformable material such as an open cell or closed cell polyurethane foam plastic. The characteristics of the body member, such as density, indentation force deflection, or IDF, color, ball rebound and the like may be selected as desired for particular applications.

A flexible cover is removably mounted on the body to cover the seat member, the first and second side members, the front member and the back member. The softness, resiliency, if any, and degree of flexibility of the cover may be selected as desired for particular applications. The cover is removable from the body member for cleaning. A zipper, hook and loop, elastic or the like may be utilized to allow the removal of the cover from the body.

In preferred embodiments of the present invention the seat member, back member, front member and both side members are unitarily molded from the plastic foam. In other embodiments of the present invention, one or more of the seat member, the back member, the first side member, the second side member and the front member may be separately molded or fabricated from the plastic foam and secured by, for example, adhesive to the adjacent members. Similarly, for example, the seat member may be separately fabricated from a sheet of the foam plastic and the front member, the first side member, second side member and back member may be unitarily molded from the foam plastic and secured to the seat member to define the body. Any combination of unitarily fabricated or molded parts forming the components of the body may be secured together by any desired means to form the body.

The seat member has an upper surface and a lower surface and the lower surface thereof defines a bottom face surface. The back member has an inner surface and an outer surface and the outer surface defines a rear face surface. Each of the side members has an inner surface and outer surface and the outer surface of each side member defines a side face surface. The front member has an inner surface and an outer surface and the outer surface defines a front face surface. The inner surfaces of the seat member, the back member, the side members and the front member define a pet receiving cavity therebetween.

In the preferred embodiment of the present invention, the front member of the body has a top portion that is arcuate in shape and curved downwardly towards the seat member so as to provide a forward view for the pet. The back member has a top portion extending away from the seat member and above the tops of the side members to provide additional cushioning for the head of the pet.

The front face surface of the pet seat has first walls defining a restraining strap accepting groove therein. The restraining strap accepting groove is preferably in regions adjacent to and spaced from the bottom face surface of the body member and accepts the vehicle seat belt structure for restraining the pet seat in the vehicle. Additionally, in preferred embodiments of the present invention, a first strap is affixed to the cover in regions at the top portion of the back member and adjacent one of the side members for releasably accepting the vehicle seat belt structure. Similarly, a second strap member may be affixed to the cover in regions at the top portion of the back member adjacent the other side member for the same purpose in order to allow the pet seat to be placed in any location on the seat of the vehicle. The seat belt thereby secures the pet seat in the vehicle by applying a rearwardly directed force provided by the portion of the seat belt in the strap accepting groove urging the pet seat towards the vehicle seat back as well as a downwardly direct force by the seat belt restrained by the first, or second strap. Further, the seat belt is restrained in a position that is not generally reachable by a pet in the pet seat so that the pet cannot chew or otherwise damage the seat belt. In some locations in a vehicle, such as the middle seat of front seat or the middle seat of a rear passenger seat, only a lap belt is provided. The pet seat of the present invention may still be utilized effectively in such positions with the lap belt placed into the restraining strap accepting groove to provides the desired rearwardly directed force for urging the pet seat towards the seat back.

Many seats and/or seat backs of vehicles have edge sections which are raised portions forming raised edges thereof as opposed to the older bench type seats and seat backs. The preferred embodiments of the present invention incorporate walls defining generally longitudinal arcuate walls at each side member at the bottom face surface and extending from the front face surface to the rear face surface at the bottom face surface for engagement with the raised portions on the vehicle seat. The bottom face surface between the longitudinal arcuate walls is flat so that the pet seat may be securely placed on the vehicle seat whether or not there are any raised portions of the vehicle seat.

The preferred embodiments of the present invention are also provided with upwardly extending groove at the intersection of the back member with each side member at the outer face surfaces thereof for engagement with the raised portions of the vehicle seat back. The back face surface of the pet seat between the upwardly extending grooves is preferably flat for positioning against the vehicle seat back In the preferred embodiment of the present invention, the body member extends the width of the vehicle seat so that both the longitudinal grooves and the upwardly extending grooves engage the corresponding raised portions of the vehicle seat and seat back. However, the pet seat of the present invention may be utilized effectively even in those applications wherein there are no raised portions at the edges of the vehicle seat and/or seat back.

In other embodiments of the present invention, the pet seat may be made larger than a typical vehicle seat or smaller than a particular vehicle seat as may be desired for particular applications. The overall size and proportions of the pet seat of the present invention may be varied as desired to accommodate various size pets and/or vehicle seat configurations.

BRIEF DESCRIPTION OF THE DRAWINGS

The above and other objects of the present invention my be more fully understood from the following detailed description taken together with the accompanying drawing wherein similar reference characters refer to similar elements throughout and in which.

DESCRIPTION OF THE PREFERRED EMBODIMENTS

Figure 1:
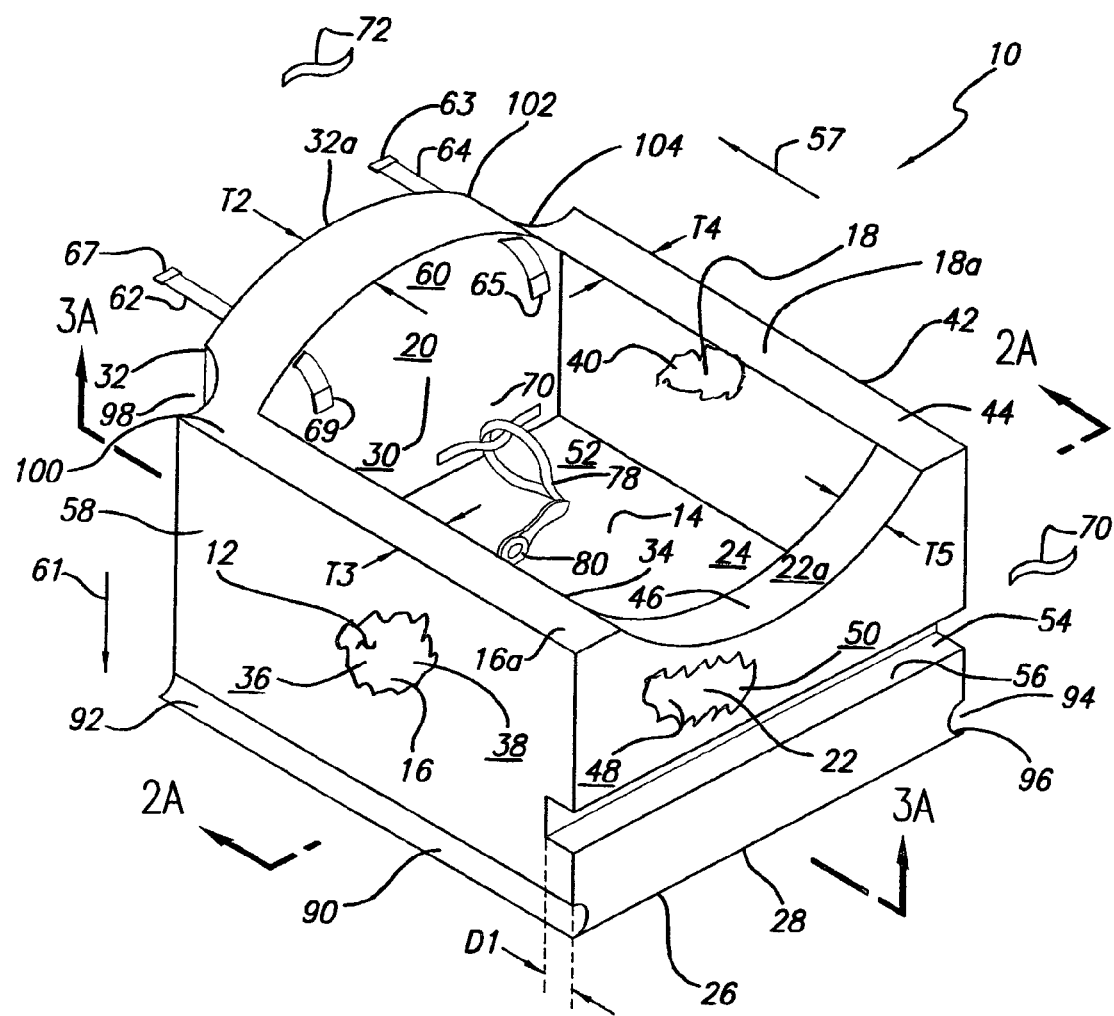
FIG. 1 is a perspective view of a preferred embodiment of the present invention.

Referring now to the drawings, there is shown in FIG. 1 a preferred embodiment of the pet seat of the present invention generally designated 10. The embodiment 10 has a body member 12 preferably fabricated from a flexible, resiliently deformable material such as a closed cell polyester and/or polyether based urethane polymer foam plastic, though depending upon the application, an open cell foam may be utilized for the body member 12. Similarly, foam materials other than polyester and/or polyether based urethane polymer may utilized for the body member 12 and materials other than a foamed plastic, such as, for example, conventional upholstery stuffing or the like may be utilized for the body 12 depending on the particular application.

In the above mentioned preferred embodiment 10, the polyurethane foam plastic may have density in the range of 0.5 to 15.0 pounds per cubic foot, a ball rebound in the range of 20% to 30% and a 25% IFD in the range of 60 to 70 although densities less than 0.5 or greater than 1.5 pounds per cubic foot and a ball rebound of less than 20% or greater than 30% and a 25% IFD less than 60 or greater than 70 may be selected depending upon the particular application of the present invention.

The body 12 is comprised of a seat member 14, a first side member 16, a second side member 18, a back member 20 and a front member 22. The seat member 14 has an upper surface 24, a lower surface 26 with a first preselected thickness T1 (FIG. 2A) therebetween. The lower surface 26 of the seat member 14 of the body 12 defines a bottom face surface 28. The back member 20 has an inner surface 30, an outer surface 32 and a second preselected thickness T2 therebetween. The outer surface 32 of the back member 20 of body 12 defines a rear face surface and the back member 20 is upstanding from the seat member 14. In preferred embodiments of the present invention, the back member 20 is at substantially a right angle to the seat member 14, though angles other than a right angle may be utilized in particular desired applications.

The first side member 16 has an inner surface 34 and an outer surface 36 with a third preselected thickness T3 therebetween. The outer surface 36 of first side member 16 defines a first side face surface 38 and the first side ember 16 of body 12 is upstanding from the seat member 14 at substantially a right angle, though angles other than a right angle may be utilized in particular desired applications.

The second side member 18 is spaced from the first side member 16 and has an inner surface 40 and an outer surface 42 with a fourth preselected thickness T4 therebetween. The outer surface 40 of second side member 18 defines a second side face surface 44 and the second side member 18 of body 12 is upstanding from the seat member 14 at substantially a right angle, though angles other than a right angle may be utilized in particular desired applications.

The front member 22 is spaced from the back member 20 and has an inner surface 46 and an outer surface 48 with a fifth preselected thickness T5 therebetween and the front member 20 is upstanding from the seat member 14 at substantially a right angle. The outer surface 48 of front member 22 defines a front face surface 50. The inner surface 30 of back member 20, the inner surface 34 of first side member 16, the inner surface 40 of second side member 18, the inner surface of front member 22 and the upper surface 24 of seat member 14 define a pet accepting cavity 52 therebetween.

In preferred embodiments of the present invention the seat member 14, first side member 16, second side member 18, back member 20 and front member 22 are unitarily fabricated, for example by molding. In other preferred embodiments, one or more of the seat member 14, first side member 16, second side member 18, back member 20 and front member 22 may be separately fabricated for example by cutting from a sheet of appropriate material from the remainder of the members and all the members joined together as may be required by an adhesive bonding, though other bonding methods as know in the art may be utilized. For example, the first side member 16 and/or the second side member 18 may be separately fabricated for example by cutting from a sheet of appropriate material and the seat member 14, back member 20 and front member 22 may be unitarily fabricated for example by molding and the first side member 16 and/or second side member 18 joined thereto by adhesive bonding. In another preferred embodiment of the present invention the seat member 14 may be separately fabricated for example by cutting from a sheet of appropriate material and the first side member 16, second side member 18, front member 22 and back member 20 may be unitarily fabricated for example by molding and then joined to the seat member 14 by adhesive bonding. Other arrangements of unitarily molded parts and separately molded or cut parts may be utilized as desired for particular applications.

If desired, the materials utilized for the various parts of the body 12 may be varied as may the characteristics thereof. For example the seat member 14 may be fabricated from a less dense foam plastic than the side member 16 and 18 and/or the back member 20 and/or the front member 22.

In the preferred embodiments of the present invention, the first preselected thickness of thickness T1 of the seat member 24 is greater than the second preselected thickness T2 of back member 20, third preselected thickness T3 of first side member 16, fourth preselected thickness T4 of second side member 18 and fifth preselected thickness T5 of front member 22. If desired, the second preselected thickness T2 of back member 20 may be greater than the third preselected thickness T3 of first side member 16 and fourth preselected thickness T4 of second side member 18. In preferred embodiments of the present invention, the third preselected thickness T3 of first side member 16 and fourth preselected thickness T4 of second side member 18 may be the same. Variations in the thickness selected for each member of body 12 may be chosen as may be desired for particular applications.

The front face surface 50 has first walls 54 defining a restraining strap accepting groove 56 therein which is spaced from the bottom face surface 28. The restraining strap accepting groove 56 extends towards the back member 20 a distance D1 and extends across the front face surface 50 from the first side face surface 38 to the second side face surface 44. The groove 56 accepts a part of a conventional vehicle seat belt for restraining the embodiment 10 in a vehicle seat against the seat back by exerting a rearwardly directed force indicated by the arrow 57. Since the groove 56 is spaced from and not accessible to a pet in the pet accepting cavity 52 damage to the seat belt contained in the groove by, for example, the pet chewing thereon, is avoided and the integrity of the seat belt of the vehicle is maintained. This is a desirable feature of the present invention since pets, such as dogs, often chew on straps which may destroy the integrity of the seat belt.

The back member 20 has an upper portion 60 spaced above the first side member 16 and second side member 18.

A flexible cover 58 is provided in the embodiment 10 for removably covering the body 12. One or more zippers, (not shown) may be utilized for removably securing the cover as may one or more hook and loop seams or the like. The cover 58 may be fabricated from cotton, nylon, velvet, canvas or any desired material suitable for the purpose. Preferably the cover is tight fitting over the body member 12. If the cover 58 becomes soiled, it may be removed from the body 12 for appropriate cleaning. In the event a liquid seeps through the cover 58 onto the body member 12, it is preferred, as noted above, that the body member 12 be a closed cell foam plastic so that such liquid may be conveniently removed.

The back member 20 has an upper portion 60 which, in preferred embodiments of the present invention, is spaced above the top 16a of first side member 16 and top 18a of second side member 18. A first strap member 62 is coupled to the cover 58 at the upper portion 60 in regions adjacent the intersection of the back member 20 with the first side member 16 and has a releasable connection 67 and 69 for joining together to from a strap accepting loop into which the shoulder harness portion of the vehicle seat belt may be placed so as to exert a downwardly directed force indicated by the arrow 61 for urging the embodiment 10 towards the vehicle seat. When the embodiment 10 is placed in the left hand vehicle seat, the lap belt portion of the vehicle seat belt indicated by the fragmentary showing at 70 is inserted in the restraining strap accepting groove 56 and the shoulder harness portion of the vehicle seat belt indicated by the fragmentary showing at 72 is restrained by the strap 62 over the top portion 60 of the back member 20. Such an arrangement prevents the vehicle seat belt being in a position where the pet in the cavity 52 may cause damage thereto.

For the embodiment 10 placed in the right hand vehicle seat, a similar arrangement of the vehicle seat belt for restraining the pet seat may be utilized with the shoulder harness portion preferably the vehicle seat belt restrained by second strap 64 connected together by end couplings 63 and 65 as described above for the first strap 62.

The first strap 62 and second strap 64 are preferably secured to the cover 58 so as to be removable therewith when the cover 58 is removed for cleaning.

In the preferred embodiment 10 of the present invention it is desired to provide a pet restraining arrangement for restraining a pet in the cavity 50. To accomplish this criteria there is provided a third strap 76 which extends through the back member 20 in regions spaced from the seat member 14 and preferably intermediate the first side member 16 and second side member 18. The third strap member 76 is removably connected together by connecting means such a hook and loop as indicated at 77 or other fastener types to allow the cover 58 to be removed from the body 12. A pet connecting strap 78 is provided that is removable connected by, for example hook and loop type fasteners or other desired type fasteners and connected through the third strap 76. The pet connecting strap is provided with a snap type fastener indicated at 80 for connection to the collar of a pet in the cavity 52.

Since many seats and seat backs of vehicles are provided with raised portions at the edges thereof, in preferred embodiments of the present invention grooves are provided for accepting such raised portions in order that the embodiment 10 may be more securely held in place without affecting the retention on the vehicle seat and seat back. The first side face surface 36 has second walls 90 defining a first longitudinal groove 92 at said lower surface 26 of said seat member 14. The first longitudinal groove 92 extends from the front face surface 50 to the rear face surface 32. Third walls 94 on second side face surface 44 define a second longitudinal groove at the lower surface 26 of said seat member 14. The second longitudinal groove 96 extends from the front face surface 50 to the rear face surface 32 and is substantially parallel to the first longitudinal groove 92. The first and second longitudinal grooves can accept the raised portions that are on the edges of the seat of a vehicle should such be present. The flat portion 28a of the lower face surface 28 allows the embodiment 10 to rest securely on the seat of a vehicle whether or not there are any raised portions on the seat of the vehicle.

The first side face surface 38 has fourth walls 98 defining a first upstanding groove 100 adjacent the rear face surface 32 and the first upstanding groove 100 extends from the lower face surface 28 to the top portion 60 of the back member 20. The second side face surface 44 has fifth walls 102 defining a second upstanding groove 104 adjacent the rear face surface 32 and the second upstanding groove extends from the lower face surface 28 to the top portion 60 of the back member 20. The first upstanding groove 100 and second upstanding groove are substantially parallel and can accept the raised portions at the edges of a vehicle seat back should such be present. The flat portion 32a of back face surface 32 between the first upstanding groove 100 and the second upstanding groove 104 allows the pet seat embodiment 120 to rest securely against the vehicle seat back whether or not there are any raised portions thereof.

For clarity, the cover 58 is omitted from the showing in FIGS. 2A, 2B, 3A and 3B.

Figure 2A:
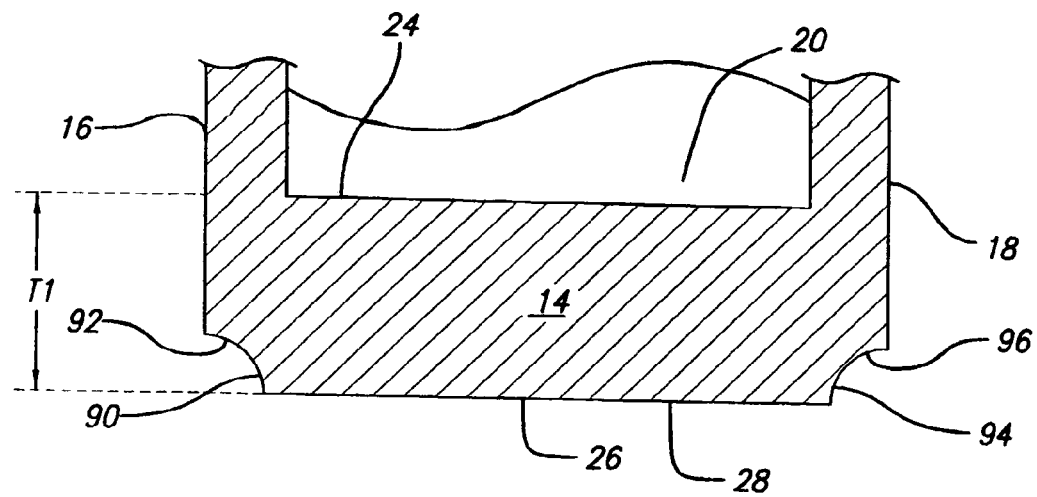
FIG. 2A is a partial sectional view along the line 2A-2A of FIG. 1.

FIG. 2A is a partial sectional view along the line 2A-2A of FIG. 1 and illustrates the preferred embodiment 10 of the present invention on which the seat member 14, first side member 16, second side member 18, back member 20 and front member 22 are unitarily fabricated by, for example molding.

Figure 2B:
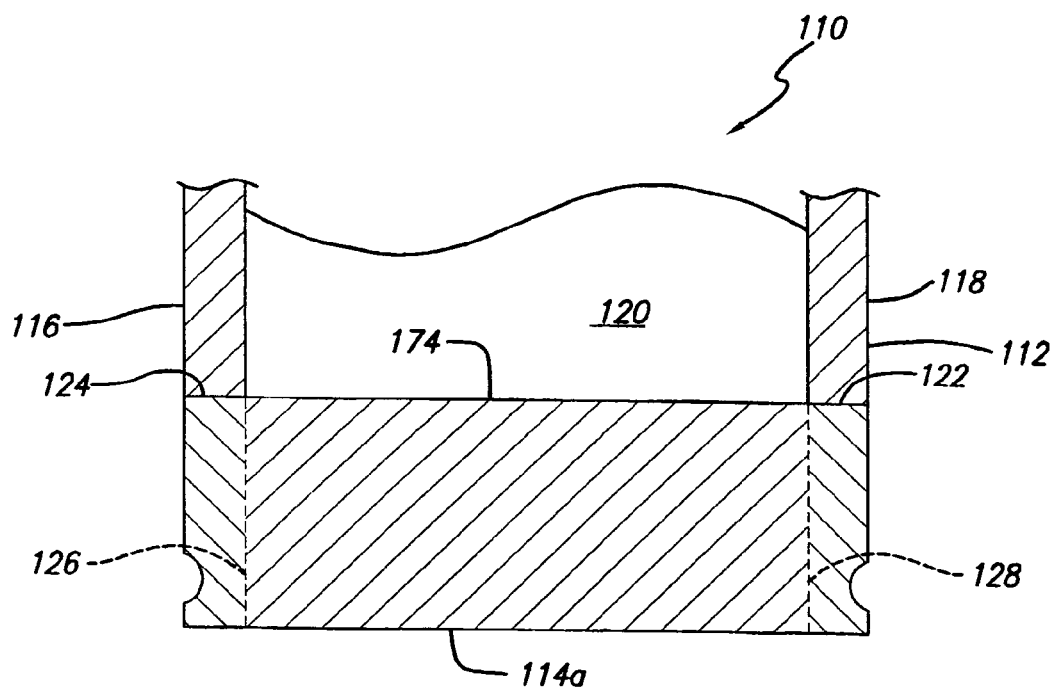
FIG. 2B is a partial sectional view similar to FIG. 2A of another preferred embodiment of the present invention.

FIG. 2B is a partial sectional view similar to FIG. 2A of another embodiment 110 of a pet seat 112 having a seat member 114 which is generally similar to the seat member 14 described above and in which a first side member 116 and second side member 118 are unitarily fabricated from, for example, a sheet of foam plastic and adhesively or other wise secured to the seat member 112. as indicated at 122 and 124.

Alternatively, the first side member 116 may extend as shown by the dotted line 126 to the bottom surface 114a of seat member 114 and bonded thereto there along. Similarly, the second side member 116 may extend as shown by the dotted line 128 to the bottom surface 114a of seat member 114 and bonded thereto there along.

Figure 3A:
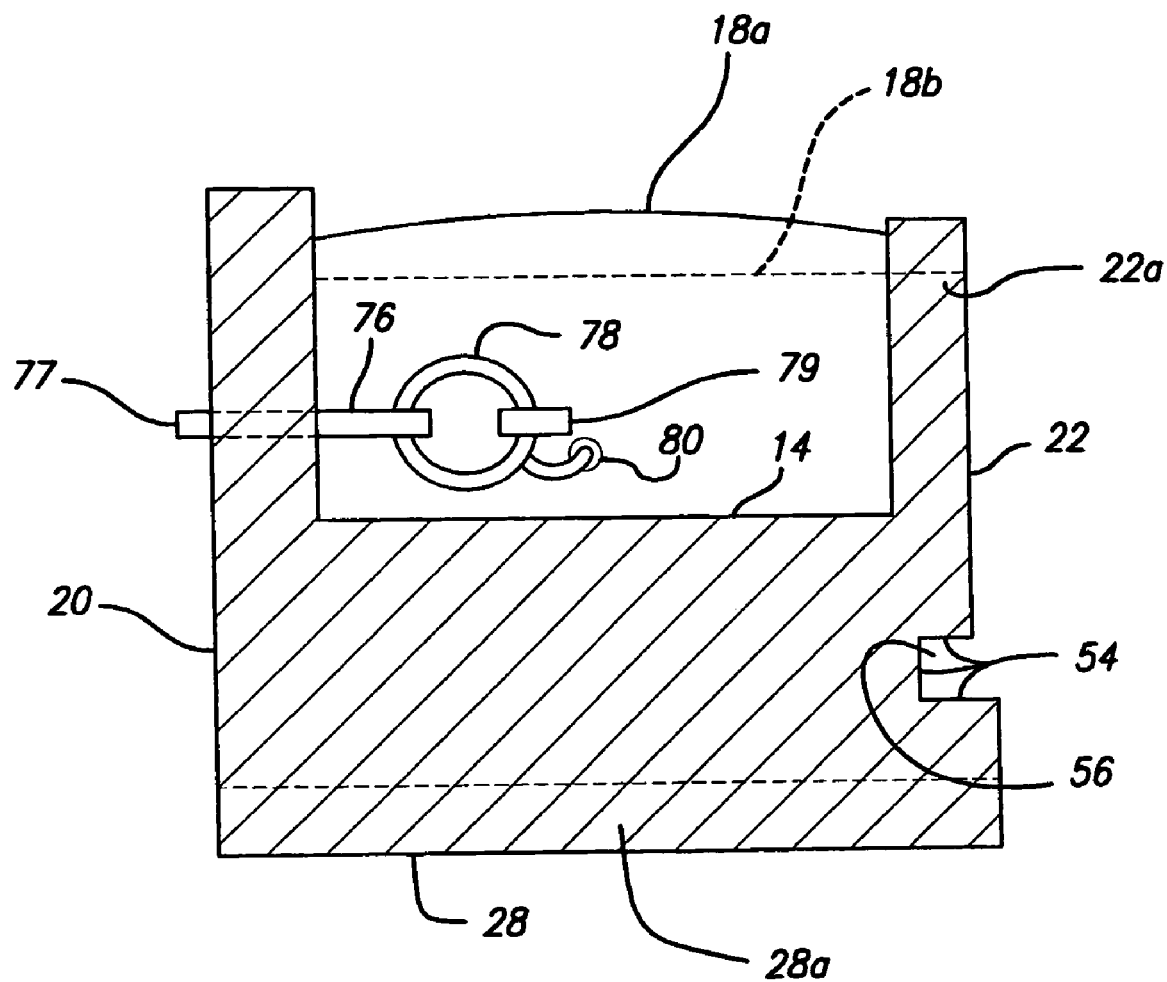
FIG. 3A is a partial sectional view along the line 3A-3A of FIG. 1.

FIG. 3A is a partial sectional view along the line 3A-3A of FIG. 1 of the embodiment 10 of the pet seat showing the seat member 14, back member 20 and front member 22 unitarily molded along with the first side member 18 (not shown in FIG. 3A) and second side member 18. As shown on FIG. 3A, the top 18a of second side 18 (and the top 16a of first side 16) may be parallel to the lower face surface 28 or may, as shown by dotted line 18b be at an angle thereto.

As shown in FIGS. 1 and 3A the top 22a of front member 22 may be arcuate extending downwardly toward the seat member 14 to provide a better forward view for a pet in the pet receiving cavity 50.

Figure 3B:
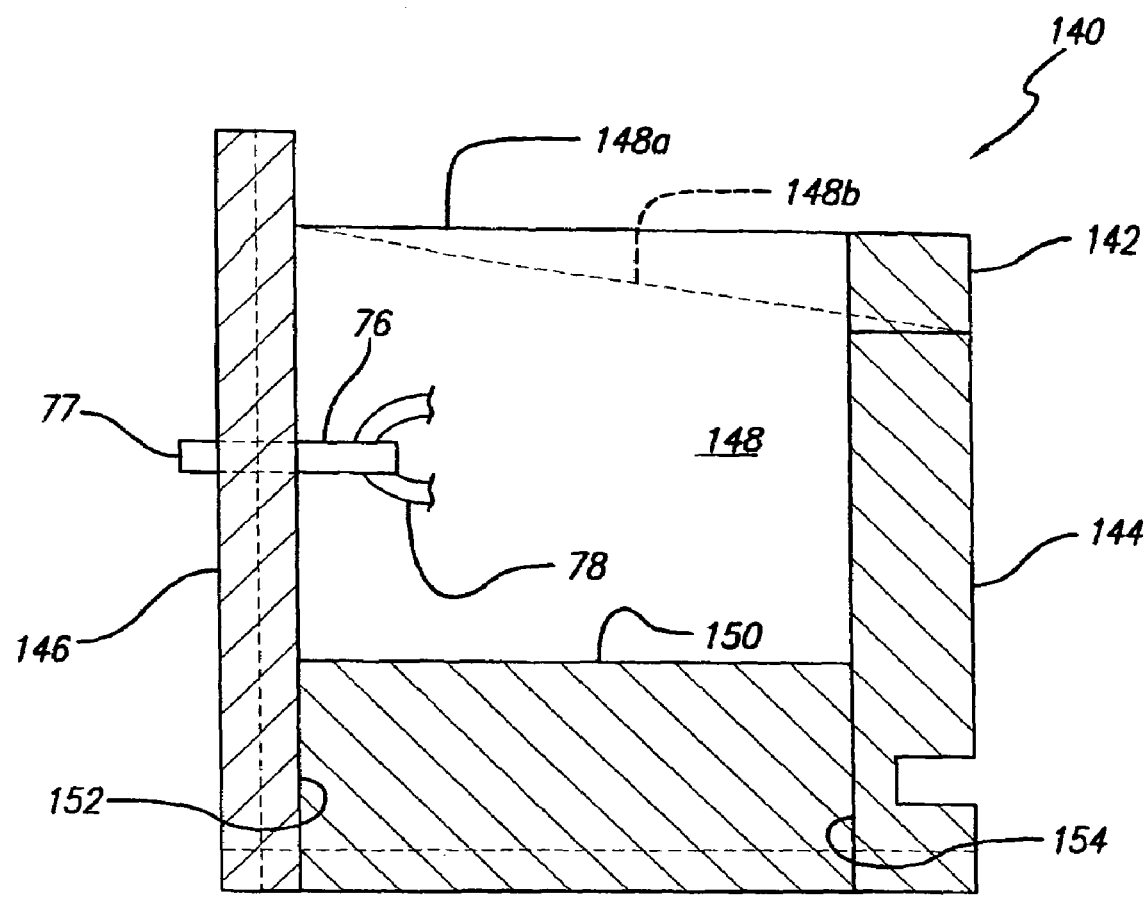
FIG. 3B is a partial sectional view similar to FIG. 3A of another preferred embodiment of the present invention.

FIG. 3B is a partial sectional view similar to FIG. 3A of an embodiment 140 of a pet seat 142 in which the front member 144, back member 146, first side member (not shown in FIG. 3B) an second side member 148 are unitarily molded and the seat member 150 is cut from a sheet of appropriate material and bonded for example by adhesive bonding as indicated at 152 and 154 to the front member 144 and back member 146.

In the preferred embodiments of the present invention the first side face surface and the second side face surface lie in spaced apart, parallel planes and the front face surface and the back face surface lie spaced apart, parallel planes and the front member and back member are substantially at right angles to the first and second sides. Other angular relationships between the members of the pet seat of the present invention may be selected as desired for particular applications.

From the above it can be seen that there has been provided an improved pet seat for carrying a pet in a vehicle and in which the pet is secured in the pet seat and the pet seat is secured by a conventional vehicle seat belt on the seat and against the back of the vehicle seat so that the vehicle seat belt is away from the pet.

While particular embodiments and applications of the present invention have been above described an illustrated, the present invention is not limited to the precise construction and arrangements disclosed. Those persons knowledgeable in the art may conceive of certain modifications, changes and variations in the detailed embodiments disclosed above as illustrative, to suit particular circumstances or products to be formed. The invention is therefore not intended to be limited to the preferred embodiments depicted, but only by the scope of the appended claims and the reasonably equivalent apparatus and methods to those defined therein.

I claim:

1. A portable pet seat arrangement comprising, in combination:
   a flexible, resilient body comprising:
      a seat member having an upper surface and a lower surface and a first preselected distance therebetween and said lower surface defining a bottom face surface;
      a back member having an inner surface and an outer surface and a second preselected thickness therebetween, and said outer surface of said back member defining a rear face surface, said back member upstanding from said seat member;
      a first side member having an inner surface and an outer surface and a third preselected distance therebetween, a top surface, and said outer surface of said first side member defining a first side face surface, and said first side member upstanding from said seat portion;

a second side member having an inner surface and an outer surface and a fourth preselected distance therebetween and a top surface, and spaced from said first side member said outer surface of said second side member defining a second side face surface, and said second side member upstanding from said seat portion;

a front member having an inner surface and an outer surface and a fifth preselected distance therebetween and spaced from said back member, and said front member upstanding from said seat member, said inner surfaces of said seat member, said back member and said first side member and said second side member defining a pet accepting cavity therebetween; and said outer surface of said front member defining a front face surface;

said front face surface having first walls defining a restraining strap accepting groove therein in regions spaced from said bottom face surface of said seat member, and further comprising:

a flexible cover member removably mounted on said body; and, at least one strap coupled to said flexible cover member at said upper portion of said back member in regions adjacent one of said first side member and said second side member.

2. The arrangement defined in claim 1 wherein:
said back member has an upper portion and said upper portion of said back member extends away from said seat member, and further comprising:
a restraining strap member extending through said back member in regions spaced from said seat member and into said pet receiving cavity.

3. The arrangement defined in claim 1 wherein:
said first side face surface has second walls defining a first longitudinal groove at said lower surface of said seat member and extending from said front face surface to said rear face surface.

4. The arrangement defined in claim 3 wherein:
said second side face surface has third walls defining a second longitudinal groove at said lower surface of said seat member and extending from said front face surface to said rear face surface.

5. The arrangement defined in claim 4 wherein:
said first longitudinal groove is substantially parallel to said second longitudinal groove.

6. The arrangement defined in claim 1 wherein:
said first preselected thickness is greater than said second, said third and said fourth preselected distances; and, said second preselected distance is greater than said third preselected distance and greater than said fourth preselected distance.

7. The arrangement defined in claim 6 wherein:
said third preselected distance is substantially the same as said fourth preselected distance.

8. The arrangement defined in claim 1 wherein:
said first side face surface lies in a first plane; and,
said second side face surface lies in a second plane.

9. The arrangement defined in claim 8 wherein:
said first plane is substantially parallel to said second plane.

10. The arrangement defined in claim 1 wherein:
said front member, said back member, said first side member and said second side member extend upwardly at substantially right angles from said seat member.

11. The arrangement defined in claim 1 and further comprising:
a second strap coupled to said flexible cover member at said upper portion of said back member in regions adjacent the other of said first side member and said second side member.

12. The arrangement defined in claim 1 and further comprising:
a flexible cover removably mounted on said body member for covering said seat member, said back member, said front member, said first side member and said second side member.

13. The arrangement defined in claim 1 wherein:
said seat member, said first side member, said second side member said back member and said front member are unitarily molded from a polyurethane foam having a density in the range of 0.5 to 1.5 pounds per cubic foot, a ball rebound in the range of 20% to 30% and an IFD in the range of 60 to 70.

14. The arrangement defined in claim 13 wherein:
said back member has an upper portion spaced from said seat member and above said top of said first and second side members;

said first preselected thickness is greater than said second, said third and said fourth preselected distances, said second preselected distance is greater than said third preselected distance and greater than said fourth preselected distance, said third preselected distance is substantially the same as said fourth preselected distance;

said first side face surface has second walls defining a first longitudinal groove at said lower surface of said seat member and extending from said front face surface to said rear face surface;

said second side face surface has third walls defining a second longitudinal groove at said lower surface of said seat member and extending from said front face surface to said rear face surface, and said first longitudinal groove is substantially parallel to said second longitudinal groove;

said first side face surface has fourth walls defining a first upstanding groove adjacent said rear face surface and extending from said bottom face surface;

said second side face surface has fifth walls defining a second upstanding groove adjacent said rear face surface and extending from said bottom face surface, and said first upstanding groove is substantially parallel to said second upstanding groove, said front member, said back member, said first side member and said second side member extend upwardly at substantially right angles from said seat member, and further comprising:

a flexible cover removably mounted on said body member for covering said seat member, said back member, said front member, said first side member and said second side member;

a first strap coupled to said flexible cover member at said upper portion of said back member in regions adjacent said first side member;

a second strap coupled to said flexible cover member at said upper portion of said back member in regions adjacent said second side member;

a restraining strap removably mounted on said back member and extending through said back member in regions spaced from said seat member and said upper portion of said back member and into said pet receiving cavity.

15. The arrangement defined in claim 1 wherein:
at least one of said front member, said first side member, said second side member and said back member are separately fabricated and adhesively coupled to said seat member.

16. The arrangement defined in claim 1 wherein:
said front member, said first side member, said second side member and said back member are unitarily fabricated and adhesively coupled to said seat member.

17. The arrangement defined in claim 1 wherein:
said back member has an upper portion and said upper portion of said back member extends away from said seat member and above a top portion of said side members.

18. A portable pet seat arrangement comprising in combination: a flexible, resilient body having:
- a seat member having an upper surface and a lower surface and a first preselected distance therebetween and said lower surface defining a bottom face surface;
- a back member having an inner surface and an outer surface and a second preselected thickness therebetween, and said outer surface of said back member defining a rear face surface, said back member upstanding from said seat member;
- a first side member having an inner surface and an outer surface and a third preselected distance therebetween, a top surface, and said outer surface of said first side member defining a first side face surface, and said first side member upstanding from said seat portion;
- a second side member having an inner surface and an outer surface and a fourth preselected distance therebetween and a top surface, and spaced from said first side member said outer surface of said second side member defining a second side face surface, and said second side member upstanding from said seat portion;
- a front member having an inner surface and an outer surface and a fifth preselected distance therebetween and spaced from said back member, and said front member upstanding from said seat member, said inner surfaces of said seat member, said back member and said first side member and said second side member defining a pet accepting cavity therebetween; and said outer surface of said front member defining a front face surface;
- said front face surface having first walls defining a restraining strap accepting groove of therein in regions spaced from said bottom face surface said seat member; and,
- said first side face surface has fourth walls defining a first upstanding groove adjacent said rear face surface and extending from said bottom face surface.

19. The arrangement defined in claim 18 wherein:
said second side face surface has fifth walls defining a second upstanding groove adjacent said rear face surface and extending from said bottom face surface.

20. The arrangement defined in claim 19 wherein:
said first upstanding groove and said second upstanding groove are substantially parallel.

* * * * *

UNITED STATES PATENT AND TRADEMARK OFFICE
CERTIFICATE OF CORRECTION

| | | |
|---|---|---|
| PATENT NO. | : 7,574,975 B2 | Page 1 of 1 |
| APPLICATION NO. | : 11/154302 | |
| DATED | : August 18, 2009 | |
| INVENTOR(S) | : Kline | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 662 days.

Signed and Sealed this

Eighteenth Day of January, 2011

David J. Kappos
*Director of the United States Patent and Trademark Office*